(12) United States Patent
Hassan et al.

(10) Patent No.: US 8,016,245 B2
(45) Date of Patent: *Sep. 13, 2011

(54) DYNAMIC BUMPS FOR DRAG REDUCTION AT TRANSONIC-SUPERSONIC SPEEDS

(75) Inventors: Ahmed A. Hassan, Mesa, AZ (US);
Bradley A. Osborne, Manchester, MO (US); Scott Schwimley, Foristell, MO (US); Garry Billman, Troy, MO (US);
Mary Billman, legal representative, Troy, MO (US)

(73) Assignee: The Boeing Company, Chicago, IL (US)

( * ) Notice: Subject to any disclaimer, the term of this patent is extended or adjusted under 35 U.S.C. 154(b) by 680 days.

This patent is subject to a terminal disclaimer.

(21) Appl. No.: 11/583,140

(22) Filed: Oct. 18, 2006

(65) Prior Publication Data
US 2009/0084906 A1 Apr. 2, 2009

(51) Int. Cl.
*B64C 21/08* (2006.01)
*B64C 23/04* (2006.01)
*B64C 23/06* (2006.01)

(52) U.S. Cl. .......... 244/200.1; 244/204.1; 244/208; 244/130; 244/1 N (58) Field of Classification Search .......... 244/208, 244/207, 209, 204, 200.1, 35 A, 1 N, 204.1
See application file for complete search history.

(56) References Cited

U.S. PATENT DOCUMENTS

| | | | |
|---|---|---|---|
| 2,545,010 A | 3/1951 | Stalker | |
| 4,382,569 A | 5/1983 | Boppe et al. | |
| 5,054,720 A | 10/1991 | Page | |
| 5,433,404 A * | 7/1995 | Ashill et al. | 244/204 |
| 5,788,191 A | 8/1998 | Wake et al. | |
| 5,813,625 A | 9/1998 | Hassan et al. | |
| 5,938,404 A | 8/1999 | Domzalski et al. | |
| 5,957,413 A * | 9/1999 | Glezer et al. | 244/208 |
| 6,042,059 A | 3/2000 | Bilanin et al. | |
| 6,092,090 A | 7/2000 | Payne et al. | |
| 6,092,990 A | 7/2000 | Hassan et al. | |
| 6,135,395 A | 10/2000 | Collett | |
| 6,234,751 B1 | 5/2001 | Hassan et al. | |
| 6,302,360 B1 | 10/2001 | Ng | |

(Continued)

OTHER PUBLICATIONS

Vadillo, et al., "Active Control of Shock/Boundary Layer Interaction in Transonic Flow Over Airfoils", Proceedings of the Third International Conference on Computational Fluid Dynamics, Toronto, Jul. 12-16, 2004, Part VIII, pp. 361-366.*

(Continued)

*Primary Examiner* — Tien Dinh
*Assistant Examiner* — Richard R Green
(74) *Attorney, Agent, or Firm* — Harness, Dickey & Pierce, P.L.C.

(57) ABSTRACT

A system for reducing overall drag of a mobile platform includes a surface on which an airflow forms a boundary layer and a generally normal shockwave. The airflow is at a first velocity that is one of transonic and supersonic. An oscillating jet injects and extracts a jet flow through the surface. The jet flow is at a second velocity that is substantially less than the first velocity. A recirculation region is upstream of the normal shockwave and is disposed at least partially in the boundary layer. The recirculation region is established at least by the oscillating jet. A generally oblique wave is established by the recirculation region and weakens the normal shockwave to reduce the overall drag experienced by the surface.

10 Claims, 10 Drawing Sheets

U.S. PATENT DOCUMENTS

| | | | |
|---|---|---|---|
| 6,390,116 B1 | 5/2002 | Kim et al. | |
| 6,457,654 B1 * | 10/2002 | Glezer et al. | 239/4 |
| 6,471,477 B2 | 10/2002 | Hassan et al. | |
| 6,543,719 B1 | 4/2003 | Hassan et al. | |
| 6,644,598 B2 * | 11/2003 | Glezer et al. | 244/208 |
| 6,685,143 B1 | 2/2004 | Prince et al. | |
| 6,713,901 B2 | 3/2004 | Hassan et al. | |
| 6,821,090 B1 | 11/2004 | Hassan et al. | |
| 6,866,234 B1 | 3/2005 | Hassan et al. | |
| 6,899,302 B1 | 5/2005 | Hassan et al. | |
| 6,994,297 B1 * | 2/2006 | Hassan et al. | 244/204 |
| 7,048,235 B2 | 5/2006 | McLean et al. | |
| 2002/0081198 A1 | 6/2002 | Hassan et al. | |
| 2002/0195526 A1 | 12/2002 | Barrett et al. | |
| 2005/0056731 A1 | 3/2005 | Hamilton et al. | |
| 2006/0027711 A1 | 2/2006 | Boldrin et al. | |
| 2006/0060720 A1 * | 3/2006 | Bogue | 244/200 |

OTHER PUBLICATIONS

Doerffer, et al., "Shock Wave—Boundary Layer Interaction Control By Streamwise Vortices", XXI ICTAM, Aug. 15-21, 2004, Warsaw, Poland.*

Madsen, Casey, Hassan, Ahmed A., Schwimley, Scott, "Alteration of the FlowField in a Transonic Flow Environment Using Synthetic Jets", AIAA 2006-3159, copyright 2006.

Geissler, W., et al., "Dynamic Stall and its Passive Control Investigations on the OA209 Airfoil Section", Germany, pp. 41.1-41.14.

Singh, C. et al., "Control of Rotorcraft Retreating Blade Stall Using Air-Jet Vortex Generators", Journal of Aircraft, vol. 43, No. 4, Jul.-Aug. 2006, pp. 1169-1176.

Kinneard, Doug, A Small Product's Big Potential, article, Boeing Frontiers Online, (Sep. 2003) vol. 2, Issue 5.

* cited by examiner

FIG 14

DYNAMIC BUMPS FOR DRAG REDUCTION AT TRANSONIC-SUPERSONIC SPEEDS

FIELD

The present teachings relate to adjusting an aerodynamic surface operable in a transonic and a supersonic flow, and more specifically to a recirculation region that is akin to a dynamic bump established by an oscillating jet in the aerodynamic surface that can reduce overall drag.

BACKGROUND

Figure 1:
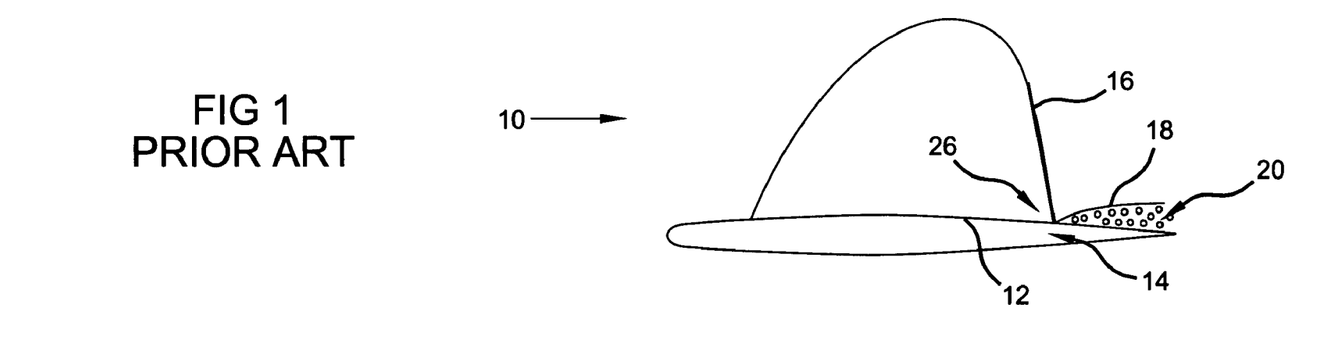
FIG. 1 is a prior art diagram showing an airfoil in a transonic or a supersonic flow and formation of a strong normal shockwave and a boundary layer that has separated downstream from the strong normal shockwave.

The demand for faster and more efficient aircraft is balanced with the cost of producing sufficient thrust to overcome the related drag at the desired speeds. When aircraft operate in a transonic or a supersonic regime, a flow 10 over a surface 12 of a wing 14 can form a strong normal shockwave 16 and a boundary layer 18, as shown in FIG. 1. At transonic and supersonic speeds, the strong normal shockwave 16 with its attendant wave drag being the dominant component of drag can adversely impact the aerodynamic performance of the aircraft. For example, the strong normal shockwave 16 can cause the boundary layer 18 to separate from a portion of the wing 14 and can establish a separation region 20 in the flow 10. The separation of the boundary layer 18 can further increase the drag experienced by the wing 14.

Figures 2, 3:
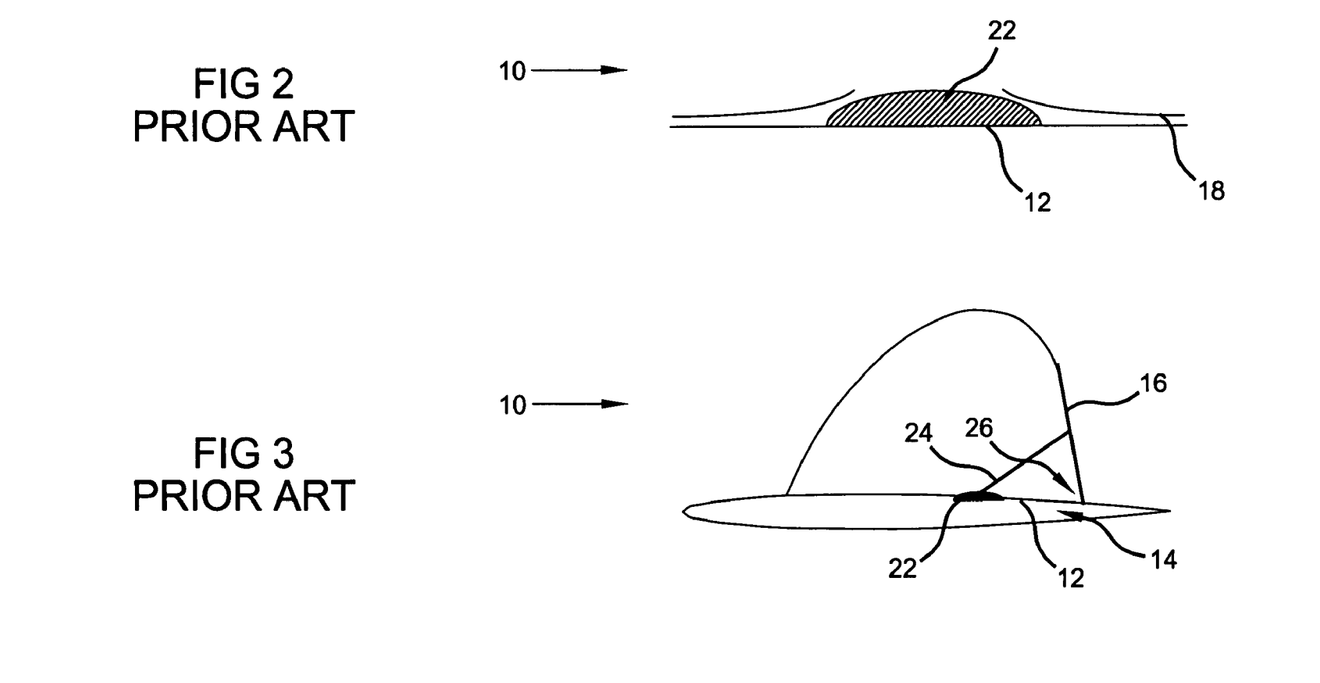
FIG. 2 is a prior art diagram showing a fixed physical surface bump mounted to the airfoil of FIG. 1.
FIG. 3 is a prior art diagram similar to FIG. 1 showing the fixed physical surface bump of FIG. 2 that can establish a weak oblique shockwave that can weaken the strong normal shockwave of FIG. 1 in certain flow conditions and airfoil orientations.

Different active or passive techniques have been investigated for control of the interaction between the strong normal shockwave 16 and the boundary layer 18. With reference to FIG. 2, one passive technique can include the use of fixed physical surface bumps 22 in the flow 10 that can tailor a local curvature of the surface 12 on the wing 14. With reference to FIG. 3, and for certain values of Mach number and angle of attack, the physical surface bumps 22 can be shown to relatively weaken the strong normal shockwave 16 and the magnitude of the associated drag. The fixed physical surface bumps 22 can establish a weak oblique shockwave 24 that can interact with the strong normal shockwave 16 to reduce its strength. At different but otherwise useful values of Mach number and angles of attack, however, the fixed physical surface bumps 22 can be shown to penalize the aerodynamic performance of the wing 14.

Other passive techniques not specifically illustrated can include sub-boundary layer vortex generators (i.e., small vertical tabs that extend into the boundary layer 18 from the surface 12 of the wing 14) and streamwise surface slits (i.e., vented wells), each of which can be positioned upstream of the strong normal shockwave 16. Each technique, at certain values of Mach number and angle of attack, can be shown to reduce the strength of the strong normal shockwave 16 and the associated wave drag. In addition, use of a porous surface (e.g., a plenum) at the foot of the strong normal shockwave 16 for certain values of Mach number and angle of attack can also be shown to reduce the strength of the strong normal shockwave and the associated wave drag by reducing a pressure jump across a foot 26 of the strong normal shockwave 16.

One active flow control technique can include a steady blowing jet located just upstream of the foot 26 of the strong normal shockwave 16 to again reduce its strength. While useful in some implementations, the steady blowing jet can be shown to reduce the lifting capability of the wing because of the relatively high jet momentum and mass flow rate required. In this instance, the Mach number of the airflow from the steady blowing jet can be comparable to the Mach number of the local airflow 10 over the wing 14. While the above examples remain useful in certain instances, there remains room in the art for improvement.

SUMMARY

The present teachings generally include a system for reducing overall drag on an exterior surface of a mobile platform. The system includes a surface on which an airflow forms a boundary layer and a generally normal shockwave. The airflow is at a first velocity that is one of transonic and supersonic. An oscillating jet injects and extracts a jet flow through the surface. The jet flow is at a second velocity that is substantially less than the first velocity. A recirculation region is upstream of the normal shockwave and is disposed at least partially in the boundary layer. The recirculation region is established at least by the oscillating jet. A generally oblique wave is established by the recirculation region and weakens the normal shockwave.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present teachings in any way.

DETAILED DESCRIPTION

The following description is merely exemplary in nature and is not intended to limit the present teachings, their application or uses. It should be understood that throughout the drawings, corresponding reference numerals indicate like or corresponding parts and features.

Various aspects of the present teachings can be applicable to any of a wide range of high speed, airborne mobile platforms, but is particularly useful with jet powered aircraft (e.g., but not limited to, fighter jets, commercial jets, private jets, supersonic dash aircraft, among others). The present teachings are also applicable to both unmanned and manned aircraft, e.g., directly, remotely, via automation, one or more combinations thereof, among others. In addition, various aspects of the present teachings can be applicable to any of a wide range of lift-producing or thrust-producing surfaces for aircraft (e.g., but not limited to, fixed wings, variable geometry wings, rotary wings, right semi-span wings, left semi-span wings, full-span wings, straight wings, swept wings, delta wings, horizontal tails, vertical tails, tapered wings, untapered wings, slanted wings, among others). Accordingly, the specific references to a wing, an airfoil and/or an aircraft herein should not be construed as limiting the scope of the present teachings to those specific implementations.

Moreover, certain terminology can be used for the purpose of reference only and do not limit the present teachings. For example, terms such as "upper," "lower," "above" and "below" can refer to directions in the drawings to which reference is made. Terms such as "front," "back," "rear" and "side" can describe the orientation of portions of the component within a consistent but arbitrary frame of reference which can be made more clear by reference to the text and the associated drawings describing the component under discussion. Such terminology may include the words specifically mentioned above, derivatives thereof and words of similar import. Similarly, the terms "first," "second" and other such numerical terms referring to structures, systems and/or methods do not imply a sequence or order unless clearly indicated by the context.

Figure 4:
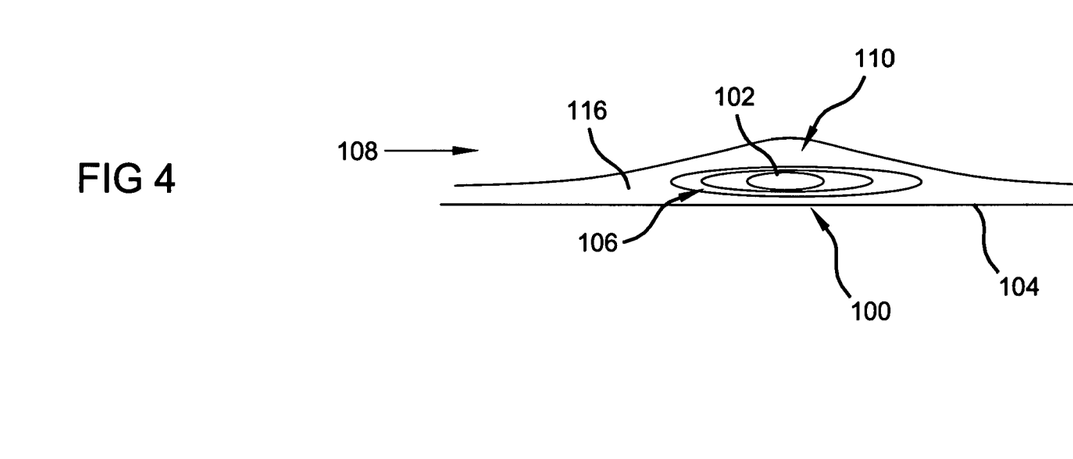
FIGS. 4 and 5 are diagrams of oscillating jets that can inject and extract a jet flow in an air flow over a surface in which the jets are disposed to establish a recirculation region in the air flow in accordance with the present teachings.
Figure 5:
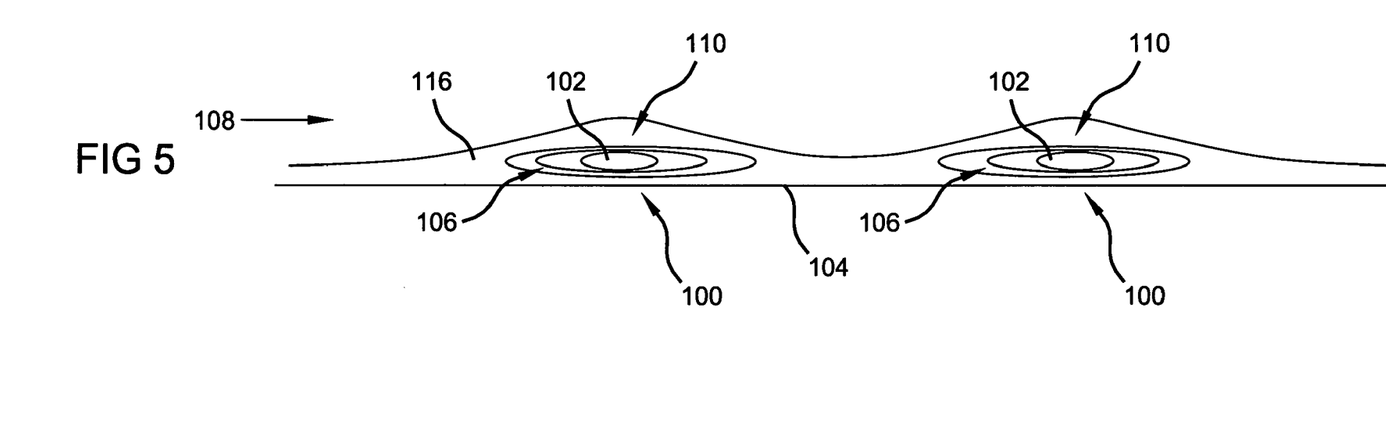
Figure 6:
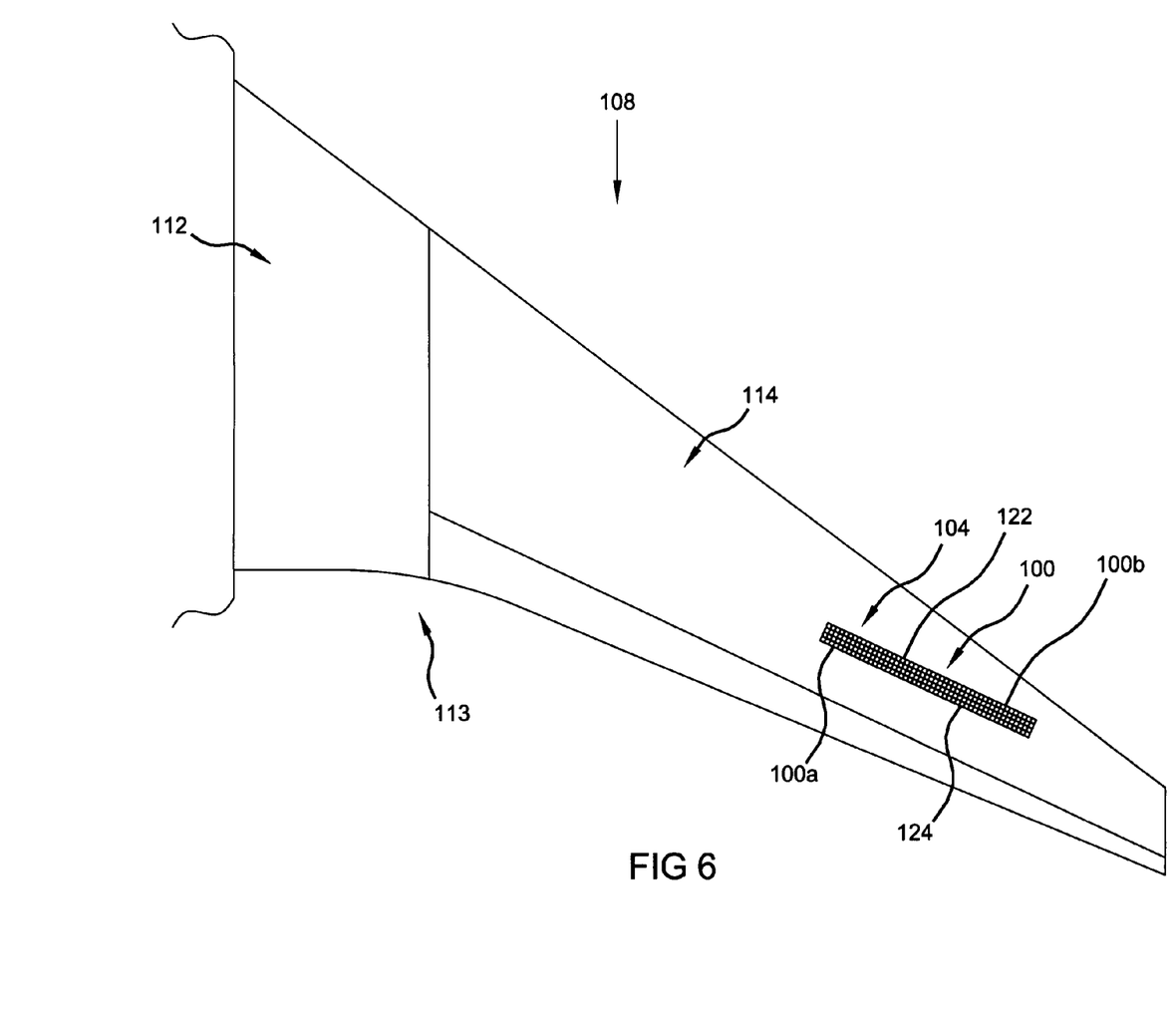
FIG. 6 is a top view of an exemplary wing having a plurality of oscillating jets disposed on a top surface of the wing in accordance with the present teachings.

With respect to FIGS. 4, 5 and 6, the various aspects of the present teachings can include one or more oscillating jets 100 that can inject and extract a jet flow 102 through an aerodynamic surface 104 of an airborne mobile platform. In doing so, the oscillating jets 100 can produce one or more recirculation regions 106. To an observer of an external air flow 108 over the aerodynamic surface 104, local flow features in the vicinity of one or more of the oscillating jets 100, in a mean sense, can appear to be similar to local flow features associated with the presence of a fixed physical surface bump (e.g., the fixed physical surface bump 22 illustrated in FIG. 2) at a similar location to the oscillating jets 100. In contrast to the fixed physical surface bumps 22, however, the oscillating jets 100 can adjust the size of the recirculation regions 106 based on, for example, changes to conditions of the airflow 108, a strength of each of the oscillating jets 100 and/or orientations of the aerodynamic surface 104, such that the variable recirculation regions 106 can be more akin to dynamic bumps 110.

Figure 7:
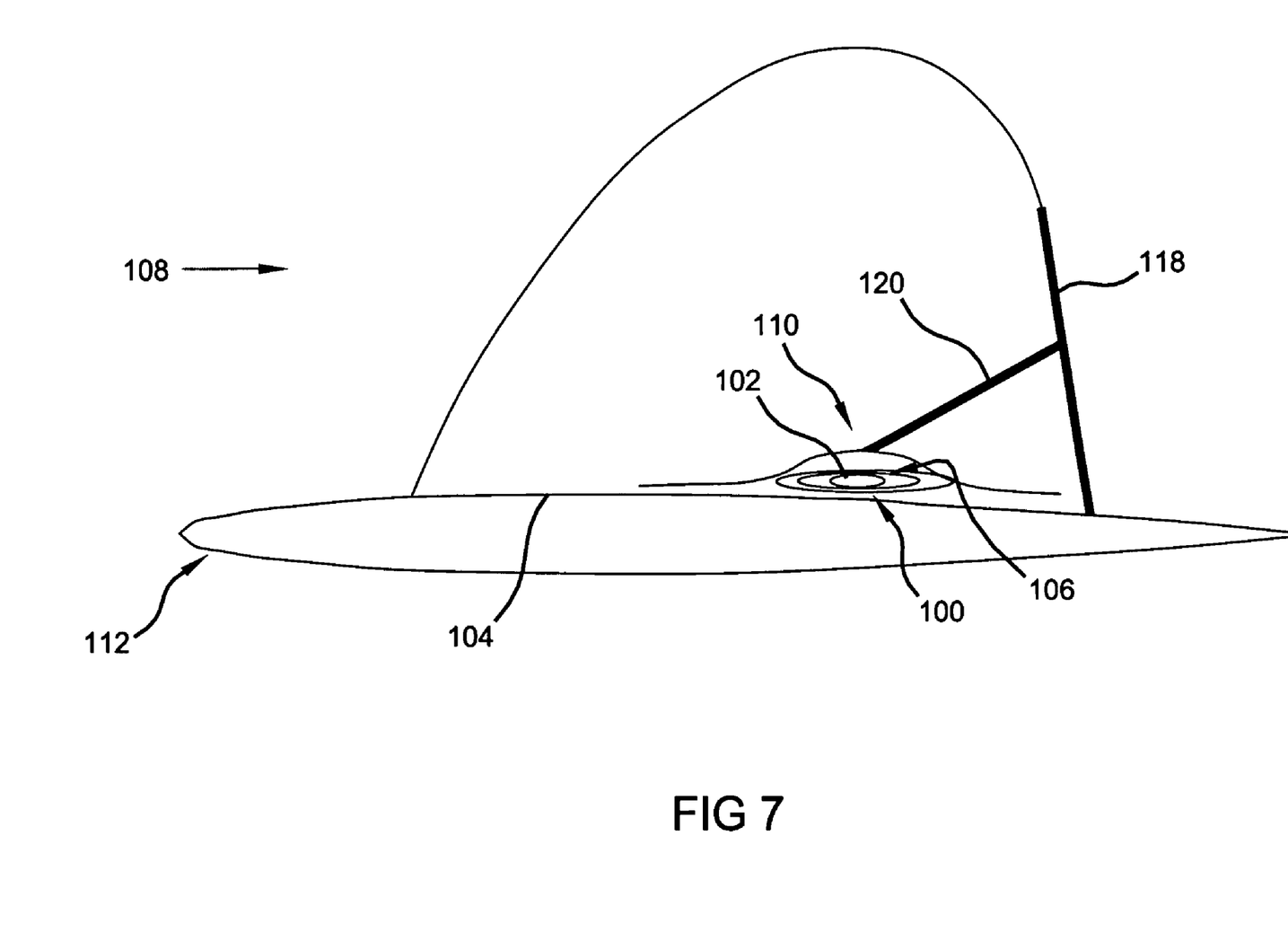
FIG. 7 is a diagram showing the recirculation region established by the oscillating jet that can establish a weak oblique wave. The weak oblique wave can interact with the strong normal shockwave of FIG. 1 to weaken the strong normal shockwave and, therefore, establish a weak normal shockwave in accordance with the present teachings.

In one example, the oscillating jets 100 can be contained within a wing 112 of an aircraft 113. The oscillating jets 100 can be located to inject and extract the jet flow 102 at various positions along an upper surface 114 to establish the recirculation regions 106, i.e., the dynamic bumps 110, thereon. The wing 112 can be used in a transonic flow (i.e., a value of the Mach number is within a range between about 0.85 and about 1) and a supersonic flow (i.e., a value of the Mach number is within a range between about 1 and about 5). In these flows and with reference to FIG. 7, the airflow 108 over the wing 112 can establish a boundary layer 116 (FIG. 5) and can produce a normal shockwave 118. The jet flow 102 from the oscillating jets 100 can be injected and extracted through the aerodynamic surface 104 to form the recirculation regions 106 in various positions in front of the normal shockwave 118.

In various examples, the jet flow 102 that establishes the recirculation regions 106 can produce an oblique wave 120 that can be a weak oblique shockwave. The oblique wave 120 can interact with the normal shockwave 118 to reduce wave drag experienced by the wing 112 in the transonic and the supersonic flows. In light of this disclosure, it will be appreciated that without the jet flow 102 from the oscillating jets 100, the normal shockwave 118 can be similar to the strong normal shockwave 16 (FIG. 1). By introducing the jet flow 102 from the oscillating jets 100, the oblique wave 120 can weaken the normal shockwave 118 to form a weak normal shockwave. Unlike the strong normal shockwave 16, the weak normal shockwave can lessen the propensity for the separation of the boundary layer 116 from the wing 112.

It will also be appreciated in light of the disclosure that the dynamic bumps 110 can reduce the overall drag of the wing 112 in a similar fashion to the fixed physical surface bumps 16, as shown in FIG. 2. Unlike the fixed physical surface bumps 16, however, the recirculation regions 106 can be adjusted by adjusting the jet flow 102 from the oscillating jets 100. The adjusting of the jet flow 102 from the oscillating jets 100 can be based on, for example, values associated with the Mach number, the angle of attack and the strength of the oscillating jets 100. The ability to adjust the recirculation regions 106 that can produce the oblique wave 120 can reduce the overall drag at multiple useful values of Mach number and/or angle of attack otherwise typically experienced by the wing 112.

Figure 11:
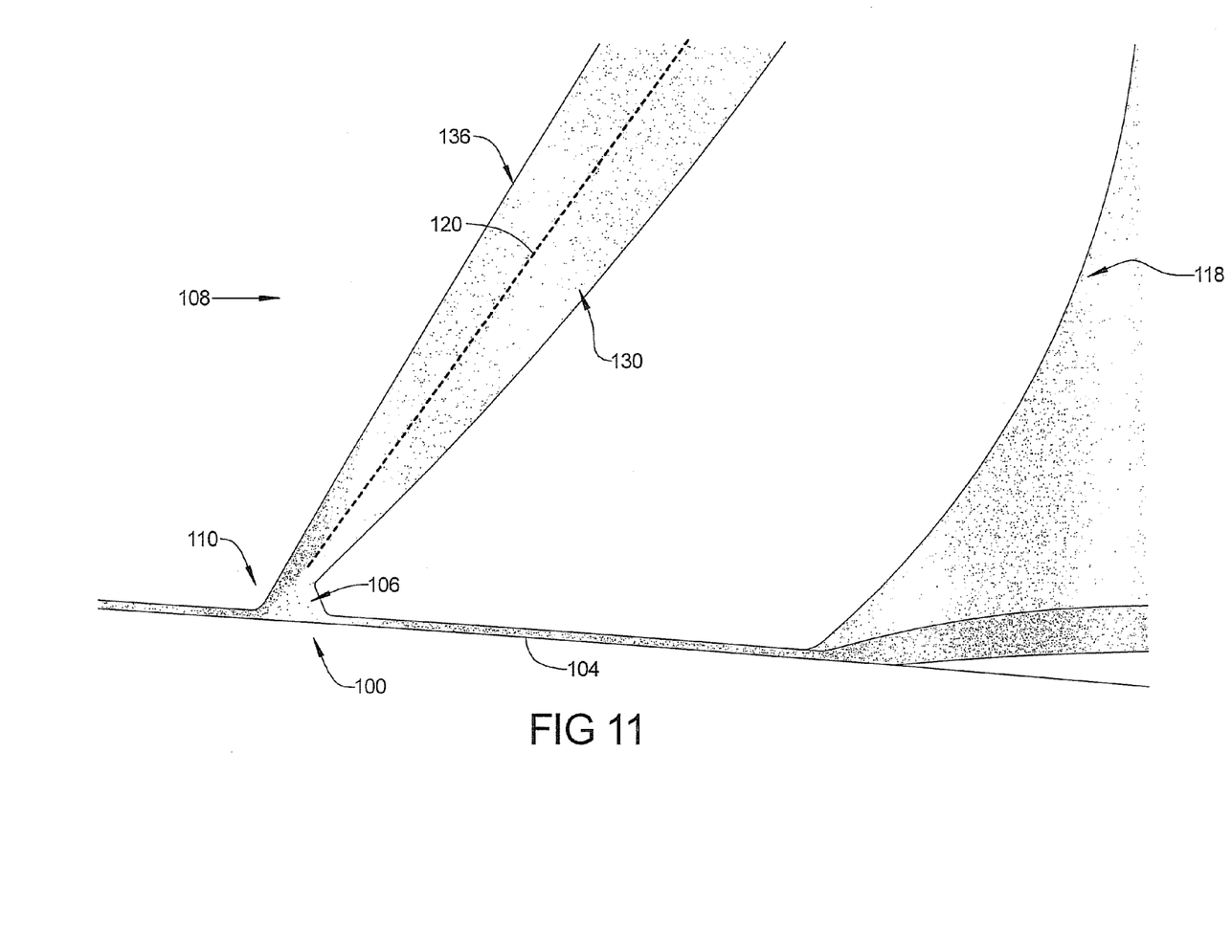
FIG. 11 is a diagram of a predicted external flow field over an aerodynamic surface in a transonic or a supersonic regime showing an oscillating jet that can establish a recirculation region that can be akin to dynamic bumps. The recirculation region can establish the weak oblique wave that can weaken the strong normal shockwave to establish a weak normal shockwave in accordance with the present teachings.

The jet flow 102 from each of the oscillating jets 100 can be generally transverse (e.g., about 90 degrees) to the wing, as illustrated in predicted results shown in FIG. 11. The jet flow 102 can also be a low momentum flow, i.e. a flow having a value of the Mach number that is substantially less than the value of the Mach number of the airflow 108. For example, the Mach number of the jet flow 102 can be as high as about 0.3. The jet flow 102 from each of the oscillating jets 100 can also oscillate between blow and suck, can also oscillate between a pulse blow and a pulse suck, can be steady or unsteady, and in some instances can be a zero-net-mass flow. In one aspect of the present teachings, the oscillating jets 100 can each produce the jet flow 102 that can be low momentum, unsteady, oscillatory, pulse blow and pulse suck, zero-net-mass and/or one or more combinations thereof.

While not specifically shown, each of the oscillating jets 100 can include, for example, an autonomous zero-net-mass flux electromagnetic (or piezoelectric) oscillatory jet actuator that can provide the oscillation between suction and blowing. In other examples, a piston and a cylinder assembly can provide the oscillation between suction and blowing. The oscillating jets 100 can further include a light weight electromagnet that can be used to actuate the piston and the cylinder assembly. Suitable electromagnets can be found, for example, in certain commercial vibration shaker applications. Other suitable oscillating jets 100 and associated systems and components are disclosed in commonly assigned U.S. Pat. Nos. 6,713,901 and 6,471,477, which are hereby incorporated by reference as if fully set forth herein.

With reference to FIG. 6, the oscillating jets 100 can introduce the jet flow 102 into the airflow through, for example, one or more slots 122 in the wing 112. In a further example, the oscillating jets 100 can introduce the jet flow 102 into the airflow through an array of holes 124 formed in the wing 112 that can (or need not be) disposed in the slots 122. In doing so, the oscillating jets 100 can establish the recirculation regions 106 that can be (partially or wholly) in the boundary layer 116.

Figure 8:
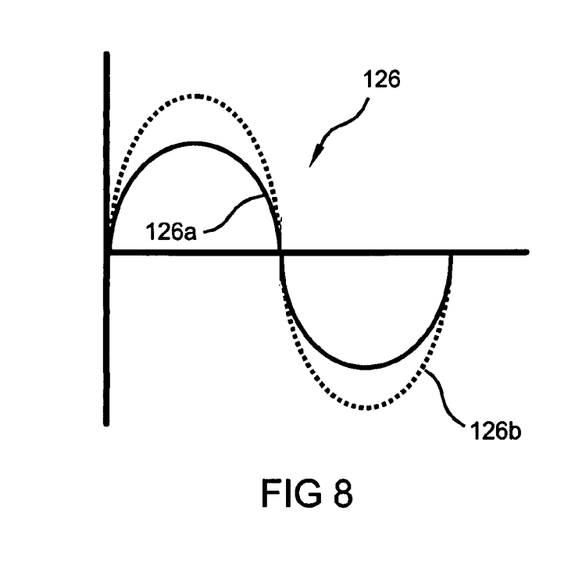
FIG. 8 is a diagram showing a value of an amplitude of the Mach number of a jet flow from a jet over time that can be decreased and increased based on, for example, changes to certain flow conditions and/or airfoil orientations in accordance with the present teachings.
Figure 9A:
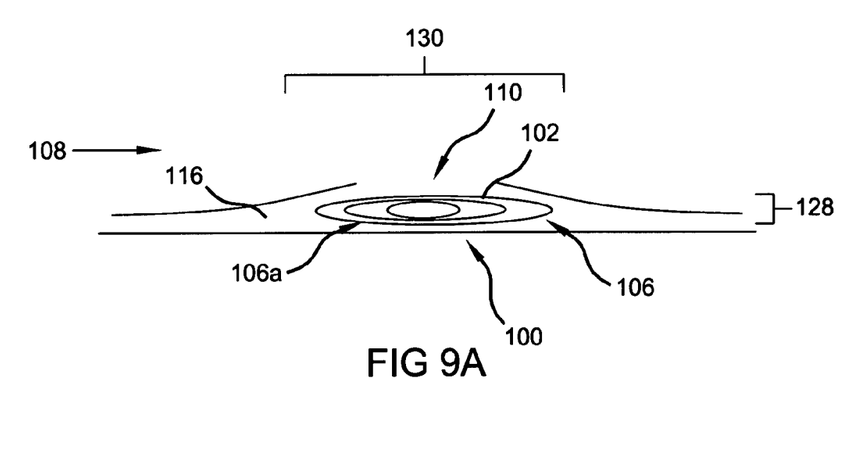
FIG. 9A is a diagram showing the oscillating jet that can inject and extract the jet flow to establish a recirculation region based on the Mach number of the jet flow as shown in FIG. 8 in accordance with the present teachings.
Figure 9B:
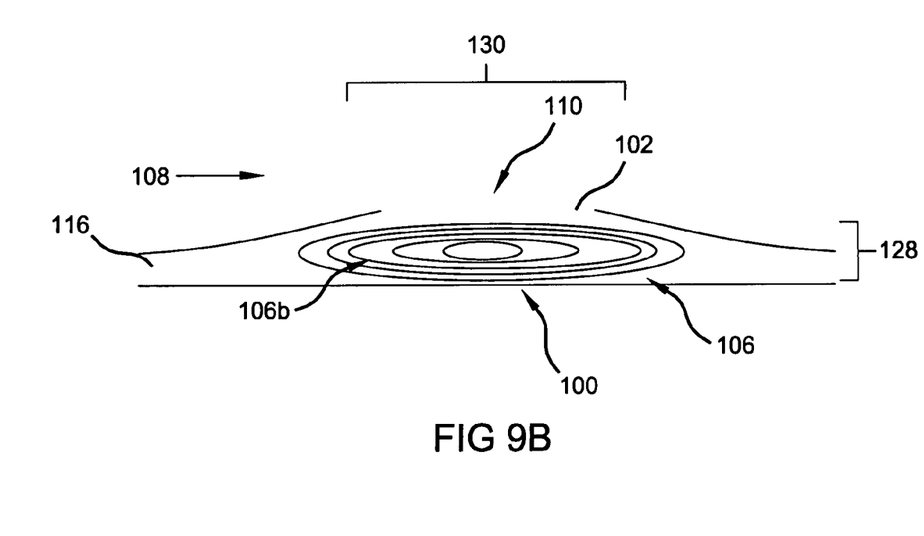
FIG. 9B is a diagram similar to FIG. 9A and shows a recirculation region that is larger than the recirculation region in FIG. 9A due to an increase in the amplitude of the Mach number of the jet flow as shown in FIG. 8 in accordance with the present teachings.

With reference to FIGS. 8, 9A and 9B, an instantaneous velocity 126 (i.e. the Mach number) of the jet flow 102 from the oscillating jets 100 can change in time between blowing and suction and, therefore, a height 128 and/or a streamwise extent (i.e., a width 130) of the associated recirculation region 106 can change in time. As such, each of the recirculation regions 106 can reach, at some time, a maximum height and/or a maximum width. By increasing and/or decreasing the maximum amplitude of the jet flow 102 from the oscillating jets 100, the maximum height and/or width of the associated recirculation region 106 can be respectively increased and/or decreased.

For example, a recirculation region 106a (FIG. 9A) can be increased in size by increasing the instantaneous velocity 126 (FIG. 8) of the jet flow 102 (i.e., from an instantaneous velocity 126a to an instantaneous velocity 126b) to produce a recirculation region 106b (FIG. 9B) that is larger than the recirculation region 106a. The increasing and/or decreasing of the amplitude of the jet flow 102 can be accomplished by adjusting, for example, electric power to an electromagnetic actuator and/or other suitable components (not shown) that can be controlled directly or indirectly by a pilot (not shown).

In the various aspects of the present teachings and with reference to FIG. 6, the oscillating jets 100 may be further divided into a first set 100a, a second set 100b, etc. Each of the sets may be in an active condition (i.e., oscillating between blowing and sucking) or in an inactive condition (i.e., neither injecting nor extracting the jet flow 102). When each of the sets 100a, 100b, etc. is in the active condition, each of the oscillating jets 100 in one of the sets (e.g., the set 100a) may oscillate in a similar or dissimilar fashion (i.e., in magnitude, frequency, etc.) to other oscillating jets in the same set. For example and as applicable, the first set 100a can all be in the active condition but certain jets in the first set 100a can oscillate differently than other jets in the first set 100a.

The first set 100a, the second set 100b, etc. of the oscillating jets 100 can be associated with certain chord positions and/or span positions, so that activating and deactivating certain jets can correspond to certain locations on the wing 112 or other suitable aerodynamic surfaces. In addition, as flight conditions (e.g., Mach number, etc.) and wing orientation (e.g., angle of attack, etc.) change, the amount of oscillating jets 100, either active or inactive, can change. Further, the fashion in which each of the oscillating jets 100 oscillates (i.e., magnitude, frequency, etc.) can change as flight conditions and/or wing orientation change.

Figure 10:
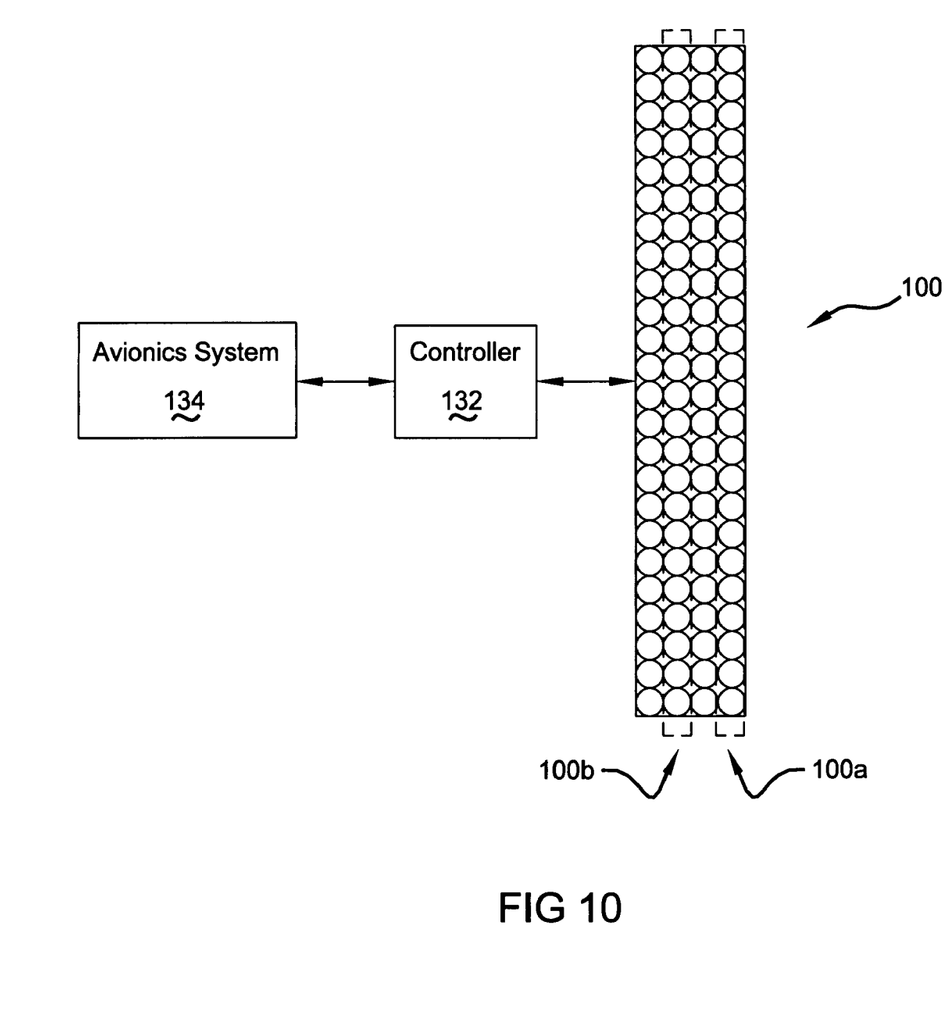
FIG. 10 is a diagram of an exemplary control system for the oscillating jets in accordance with the present teachings.

In one aspect of the present teachings and with reference to FIG. 10, the oscillating jets 100 can be controlled by a controller 132 that can be integral to or in addition to existing avionic systems 134 or other suitable navigational, flight control, flight communication, etc. systems in the aircraft. As such, the pilot (whether human and/or computer) can directly and/or indirectly control the switching of each of the oscillating jets 100 between the active and inactive conditions and/or can control the fashion in which the jet operates (i.e., adjusting magnitude, frequency, slot size, aperture size, etc.) to further facilitate the reduction of overall drag in the transonic and supersonic regimes.

The benefits of establishing the recirculation regions 106, i.e., the dynamic bumps 110, with the jet flow 102 from the oscillating jets 100 can be shown using, for example, a computational fluid dynamics tool whose accuracy can be previously established for a baseline airfoil and a control airfoil such as a NACA-64A010 airfoil through comparisons with experimental wind tunnel data. The tool can be CFL3D which is a Navier-Stokes computational fluid dynamics code developed at NASA Langley Research Center. The tool can be used to simulate the transverse oscillating jets 100 at a number of chord and/or span positions along the airfoil. The assumptions of the flow and the airfoil and the configuration of the oscillating jets 100 are provided in the following table.

| Simulation Parameters | Values |
|---|---|
| Fluid | Air |
| Airfoil | Modified NACA-64A010 |
| Free Stream Mach Number | about 0.85 |
| Reynolds Number | about 6.07 Million |
| Free Stream (onset flow) Angle of Attack | about +1 degree |
| Peak Mach Number for the Jet flow 102 (MJet) | about 0.30 |
| Jet Oscillation Frequency | about 123 Hz |
| Slot Size on Upper Surface of Airfoil | about 0.0528 inches wide (about 1.341 mm wide) |
| Nondimensional Slot Width based on a chord length of 1 foot | about 0.0044 |
| Angle at which the jet injects/extracts the jet flow 102 from the external flow | about 90 degrees |

FIG. 11 illustrates a snap-shot of the predicted constant Mach number contours in the vicinity of the transverse jet flow 102 from one of the oscillating jets 100 positioned at about 53% chord (i.e., x/C is about 0.53) on an airfoil. One of the oscillating jets 100 can establish one or more of the dynamic bumps 110 (albeit not shown dynamically due to the instantaneous nature of the snap-shot). Radial Mach lines 136 on both sides of the oblique shock wave 120 (shown as a dashed line) can be created due to the presence of the dynamic bump 110 in the airflow 108. The normal shockwave 118 can terminate on the airfoil downstream from the oscillating jet 100.

Figure 12:
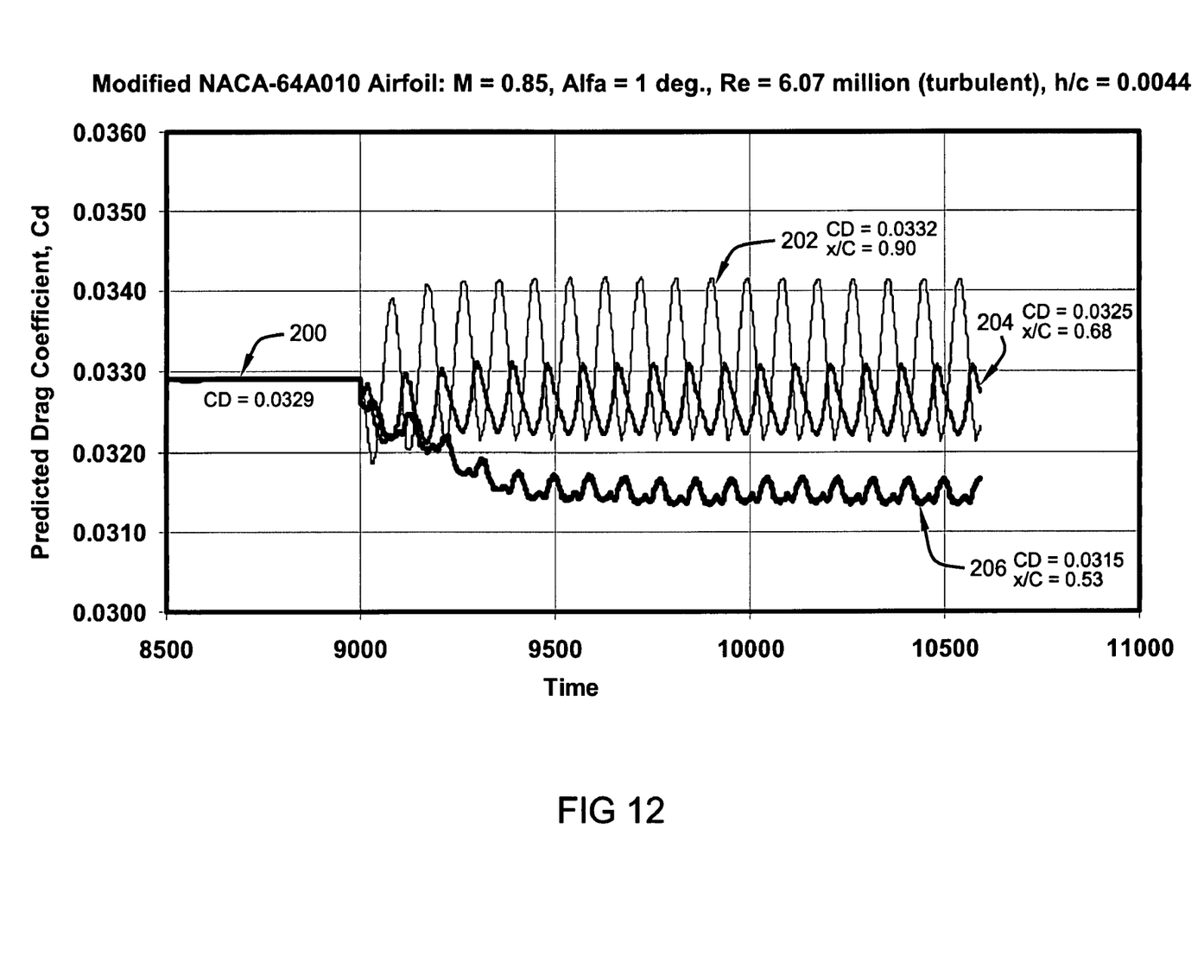
FIG. 12 is a chart showing predicted values of a drag coefficient with an oscillating jet located at about 53% chord, about 68% chord and about 90% chord of an airfoil in a transonic flow in accordance with the present teachings.

FIG. 12 illustrates temporal variations of the predicted overall drag coefficients for the NACA-64A010 airfoil as a function of three chord positions, i.e., x/C, of the oscillating jets 100. It will be appreciated that in light of this disclosure the temporal variations of the predicted overall drag can be due to the oscillations of the one or more oscillating jets 100. As shown, one of the oscillating jets 100 can be positioned in different instances at about 53%, about 68% and about 90% of the chord of the airfoil. It can be shown that the introduction of the transverse jet at about 90% chord (i.e., x/C is about 0.90) can result in a predicted increase (i.e., an adverse effect) in the overall drag level of the baseline airfoil. By comparison, it can be shown that introducing one of the oscillating jets 100 at about 53% chord (i.e., x/C is about 0.53) or in a different instance at about 68% chord (i.e., x/C is about 0.68) can be shown to result in a predicted decrease (i.e., a beneficial effect) in the overall drag level of the airfoil.

Based on these results, the baseline mean overall drag coefficient (i.e., $C_D$) can be predicted to be about 0.0329, which can be generally shown at 200, while the mean overall drag coefficient with one of the oscillating jets 100 at about 90% chord can be predicted to be about 0.0332, which can be generally shown at 202. This is about a 0.91% increase in the mean overall drag relative to the baseline, which is about a three count increase. A three count increase is equal to a 0.0003 increase in drag coefficient, such that one count is equal to 0.0001. The mean overall drag coefficient with one of the oscillating jets 100 at about 68% chord can be predicted to be about 0.0325, which can be generally shown at 204. This is about a 1.2% decrease in the mean overall drag relative to the baseline 200, which is about a three count decrease. Moreover, the mean overall drag coefficient with an active jet at about 53% chord can be predicted to be about 0.0315, which can be generally shown at 206. This is about a 4.3% decrease in the overall drag relative to the baseline 200, which is about a fourteen count decrease.

Figure 13:
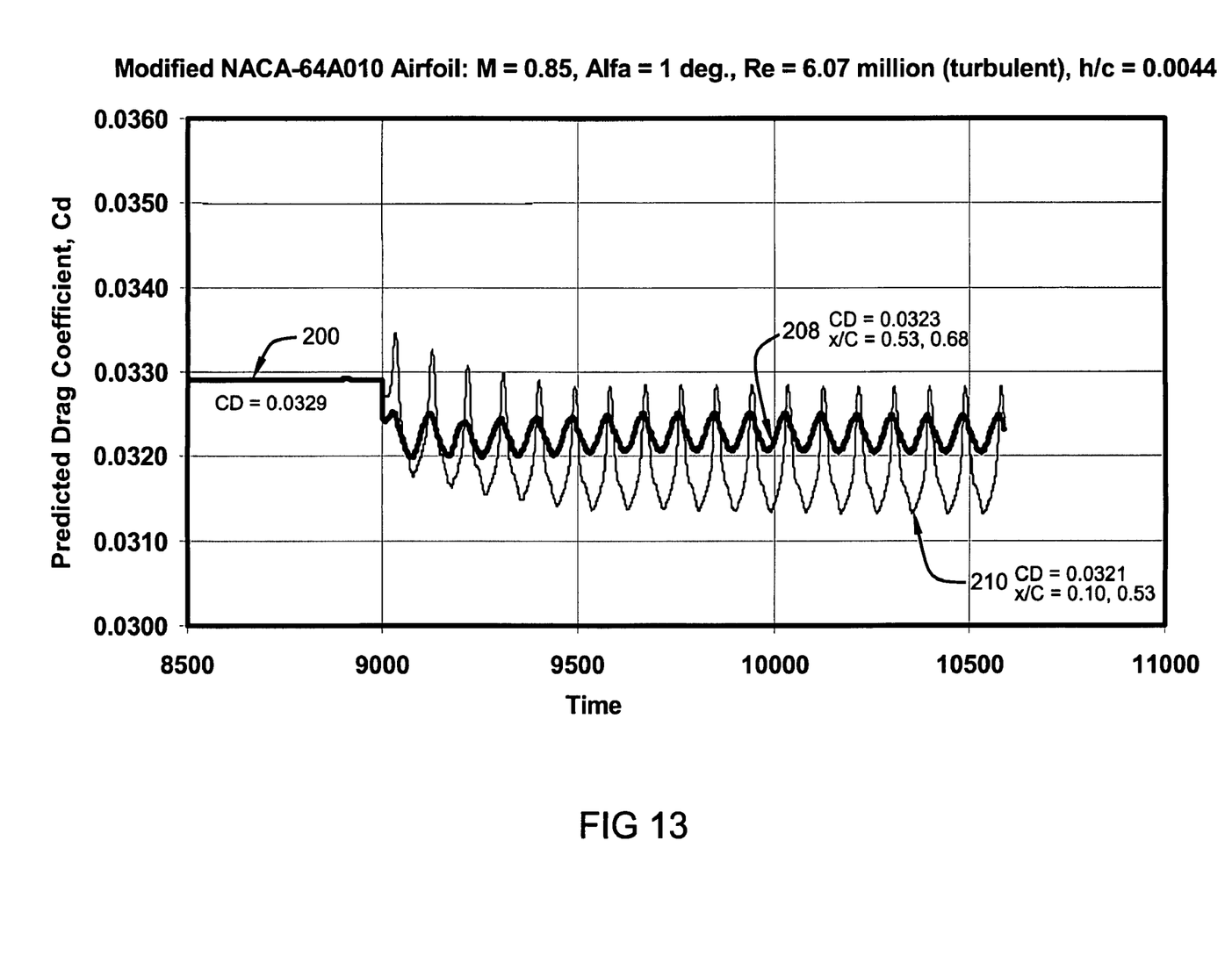
FIG. 13 is a chart showing predicted values of a drag coefficient with a pair of oscillating jets located at about 53% and about 68% chord and at about 10% and about 53% chord of an airfoil in a transonic flow in accordance with the present teachings.

FIG. 13 illustrates temporal variations of the predicted overall drag coefficients for the NACA-64A010 airfoil as a function of two pairs of the oscillating jets 100 in the same airfoil as above. In one instance, one of the oscillating jets 100 can be positioned at about 53% chord and another one of the oscillating jets 100 can be positioned at about 68% chord. The predicted mean overall drag coefficient at such a placement can be about 0.0323, which can be generally shown at 208 and can be about a six count decrease that can be equivalent to about a 1.8% reduction in the mean overall drag level relative to the baseline 200. In another instance, one of the oscillating jets 100 can be positioned at about 10% chord and one of the oscillating jets 100 can be positioned at about 53% chord. The predicted mean overall drag coefficient at such a placement can be about 0.0321, which can be generally shown at 210 and can be about an eight count decrease. The eight count decrease can be equivalent to about a 2.4% reduction in the overall drag level relative to the baseline 200.

Figure 14:
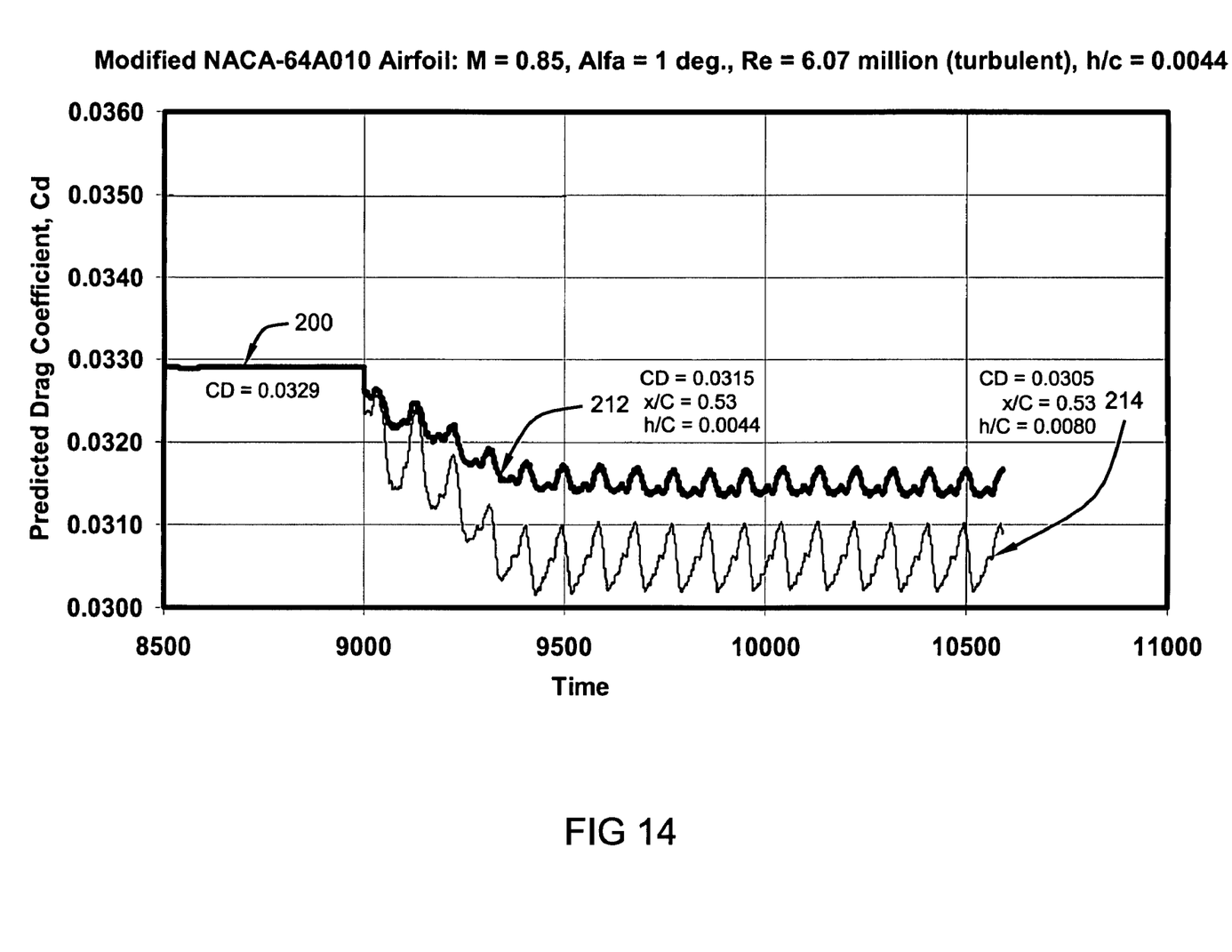
FIG. 14 is a chart showing predicted values of a drag coefficient with an oscillating jet located at about 53% chord and a slot through which the oscillating jet injects and extracts a jet flow having a nondimensional slot width of about 0.0044 and about 0.0080 of an airfoil having a chord length of about one foot (about 0.3048 meters) in a transonic regime in accordance with the present teachings.

FIG. 14 illustrates the effects of changing the width of a slot through which one or more of the oscillating jets 100 can inject and extract the jet flow 102 from the external flow on the predicted temporal variations of the mean overall drag coefficients for the NACA-64A010 airfoil. It can be shown that use of the narrow slot having a nondimensional width of about 0.0044 can be seen to result in a predicted 4.3% reduction in the mean overall drag relative to the baseline 200. By using a relatively wider slot having a nondimensional width of about 0.0080, it can be seen that there can be a further reduction in the predicted mean overall drag relative to the baseline 200.

In one instance, one of the oscillating jets 100 can be positioned at about 53% chord and the slot can have a nondimensional width of about 0.0044. The predicted mean overall drag coefficient can be about 0.0315, which can be generally shown at 212 and can be about a fourteen count decrease. The fourteen count decrease can be equivalent to about a 4.3% predicted reduction in the overall drag level relative to the baseline 200. In another instance, one of the oscillating jets 100 can be positioned at about 53% chord and the slot can have a nondimensional width of about 0.0080. The predicted mean overall drag coefficient can be about 0.0305, which can be generally shown at 214 and can be about a twenty four count decrease. The twenty four count decrease can be equivalent to about a 7.3% predicted reduction in the overall mean drag level relative to the baseline 200.

It will be appreciated that in light of the disclosure, certain configurations of the slot and certain positioning of the oscillating jets 100 can maximize the percent reduction in overall drag for an aircraft traveling in the transonic and the supersonic regimes. In one example, a row of the oscillating jets 100 can be located at a certain chord position and extend generally along the span of wing 112. In other examples, the oscillating jets 100 can be positioned as to cover portions of the wing along portions of the chord and portions of the span. In this instance, certain oscillating jets 100 can be placed in the active condition and regulated accordingly.

By reducing the overall drag, the oscillating jets 100 in accordance with the present teachings can be shown to improve the lift-to-drag ratio and, therefore, improve the aerodynamic efficiency of the wing or other suitable aerodynamic surfaces that can be included with airfoils, wings, rotor blades, wind turbine blades, compressor and turbine blades, etc. Further benefits can include the reduction of fuel consumption which, in turn, can reduce fuel costs especially for commercial aircraft flying at current cruise speeds. Even more so, the range and cruise speed of a commercial aircraft can be increased, while the noise produced by the shockwave can be decreased.

In further aspects of the present teachings, the oscillating jets 100 can be used to control the aircraft attitude by modulating the aerodynamic forces (e.g., lift, drag) and moments (e.g., roll, yaw, roll) that can be acting on the aircraft at transonic and supersonic speeds.

While specific aspects have been described in this specification and illustrated in the drawings, it will be understood by those skilled in the art that various changes can be made and equivalents can be substituted for elements thereof without departing from the scope of the present teachings, as defined in the claims. Furthermore, the mixing and matching of features, elements and/or functions between various aspects of the present teachings may be expressly contemplated herein so that one skilled in the art will appreciate from the present teachings that features, elements and/or functions of one aspect of the present teachings may be incorporated into another aspect, as appropriate, unless described otherwise above. Moreover, many modifications may be made to adapt a particular situation, configuration or material to the present teachings without departing from the essential scope thereof. Therefore, it may be intended that the present teachings not be limited to the particular aspects illustrated by the drawings and described in the specification as the best mode presently contemplated for carrying out the present teachings but that the scope of the present teachings will include many aspects and examples following within the foregoing description and the appended claims.

What is claimed is:

1. A system for reducing overall drag of an airborne mobile platform, the system comprising:
a surface having a spanwise length on which an airflow forms a boundary layer and a generally normal shockwave, wherein said airflow is at a first velocity that is one of transonic and supersonic;
a plurality of oscillating jets formed in an array that each at least one of inject and extract a jet flow through said surface, wherein each said jet flow is at a second velocity that is substantially less than said first velocity;
a controller that controls operation of the oscillating jets of the array;
the controller controlling the plurality of oscillating jets of the array to establish a recirculation region of a controllable dimension, using selected ones of the jets, that is upstream of said normal shockwave and that is disposed at least partially in said boundary layer, and said selected ones of said oscillating jets generating a generally oblique wave that is substantially weaker than said normal shockwave but which weakens said normal shockwave;
said array of said plurality of oscillating jets including at least a first set of oscillating jets and a second set of oscillating jets arranged parallel to said first set of oscillating jets;
said first set extends in generally a spanwise direction and is associated with a first chord position that is upstream from said second set that is associated with a second chord position;
each of said first and second sets switchable between an active condition and an inactive condition based on one of a condition of said airflow, an orientation of said surface relative to said airflow and a combination thereof;
wherein said oscillating jets oscillate between blowing and suction and said second velocity of said jet flows oscillate between a maximum blowing velocity and a maximum sucking velocity; and
wherein the controller adjusts at least two of said maximum blowing velocity, said maximum sucking velocity and a frequency of oscillation based on at least one of a flow condition, an orientation of said surface relative to said airflow, and a strength of said oscillating jets.

2. The system of claim 1, wherein said oscillating jets oscillate between pulse blowing and pulse suction.

3. The system of claim 1, wherein said surface comprises a portion of one of: a fixed wing, a variable geometry wing, a rotary wing, a right semi-span wing, a left semi-span wing, a full-span wing, a straight wing, a swept wing, a delta wing, a horizontal tail, a vertical tail, a tapered wing, an untapered wing, a slanted wing and one or more combinations thereof.

4. The system of claim 1, further comprising a wing having said surface through which said oscillating jet injects and extracts said jet flow, wherein said maximum blowing velocity and said maximum sucking velocity are adjusted based on one of said first velocity, an angle of attack of said wing relative to said airflow, a strength of said oscillating jet and one or more combinations thereof.

5. A method of reducing overall drag experienced by an airborne mobile platform, the method comprising:
establishing a boundary layer and a generally normal shockwave over a surface of the airborne mobile platform, the surface having a spanwise length, due to an airflow at a first velocity over said surface that is one of transonic and supersonic;
using a plurality of jets forming an array of jets formed in the surface, the jets oscillating between injecting and extracting a jet flow through said surface at a second velocity that is substantially less than said first velocity;
using a controller to control operation of the array of jets to generate a recirculation region from said oscillating between injecting and extracting that is upstream from said generally normal shockwave;
forming an oblique wave from said recirculation region to weaken said generally normal shockwave;
implementing said oscillating by using a plurality of oscillating jets including at least a first set of oscillating jets and a second set of oscillating jets,
each of said first and second sets extending in generally a spanwise direction generally parallel to one another, and said first set being associated with a first chord position that is upstream from said second set that is associated with a second chord position;
each of said first and second sets switchable between an active condition and an inactive condition based on one of a condition of said airflow, an orientation of said surface relative to said airflow and a combination thereof;
wherein said oscillating jets oscillate between blowing and suction and said second velocity of said jet flows oscillate between a maximum blowing velocity and a maximum sucking velocity; and
wherein the controller adjusts at least two of said maximum blowing velocity, said maximum sucking velocity and a frequency of oscillation based on at least one of a flow condition, an orientation of said surface relative to said airflow, and a strength of said oscillating jets.

6. The method of claim 5, further comprising adjusting at least one of said second velocity and a frequency of oscillation to adjust a size of said recirculation region based on at least one of said first velocity and an orientation of said surface relative to said airflow.

7. The method of claim 5, further comprising moving said recirculation region to move said oblique wave based on at least one of said first velocity and an orientation of said surface relative to said airflow.

8. An airborne mobile platform comprising:
a surface having a spanwise length on which a first airflow forms a boundary layer and a generally normal shockwave, wherein said airflow is at a first velocity;
a plurality of oscillating jets forming an array of jets that is operably associated with said surface, inject and extract jet flows through openings in said surface, said jet flows having a second velocity that is less than said first velocity;
a controller for controlling operation of the array of jets;
the controller operating to control the array of jets to generate a recirculation region of a controlled dimension that is upstream of said normal shockwave, and that is disposed at least partially in said boundary layer, said recirculation region established at least by said oscillating jets;
a generally oblique wave that is established by said recirculation region and that weakens said normal shockwave;
said plurality of oscillating jets including at least a first set of oscillating jets and a second set of oscillating jets,
said first set extending in generally a spanwise direction and being associated with a first chord position that is upstream from said second set, with said second set being associated with a second chord position and each of said first and second sets switchable between an active condition and an inactive condition based on one of a condition of said airflow, an orientation of said surface relative to said airflow and a combination thereof; and wherein said oscillating jets oscillate between blowing and suction and said second velocity of said jet flows oscillate between a maximum blowing velocity and a maximum sucking velocity; and wherein the controller adjusts at least two of said maximum blowing velocity, said maximum sucking velocity and a frequency of oscillation based on at least one of a flow condition, an orientation of said surface relative to said airflow, and a strength of said oscillating jets; and wherein the controller further controls selected ones of said lets to control a size of a recirculation regions formed by said jets.

9. The mobile platform of claim 8, wherein said mobile platform comprises an aircraft.

10. The mobile platform of claim 8, wherein said surface comprises a wing.

* * * * *